March 6, 1951

L. R. BERGEN 2,544,521

WHEEL MOUNTING ARRANGEMENT FOR VEHICLES

Filed May 11, 1948

Lionel R. Bergen
INVENTOR.

BY *Clarence A. O'Brien
and Harvey B. Jacobson*
Attorneys

March 6, 1951 L. R. BERGEN 2,544,521
WHEEL MOUNTING ARRANGEMENT FOR VEHICLES
Filed May 11, 1948 4 Sheets—Sheet 4
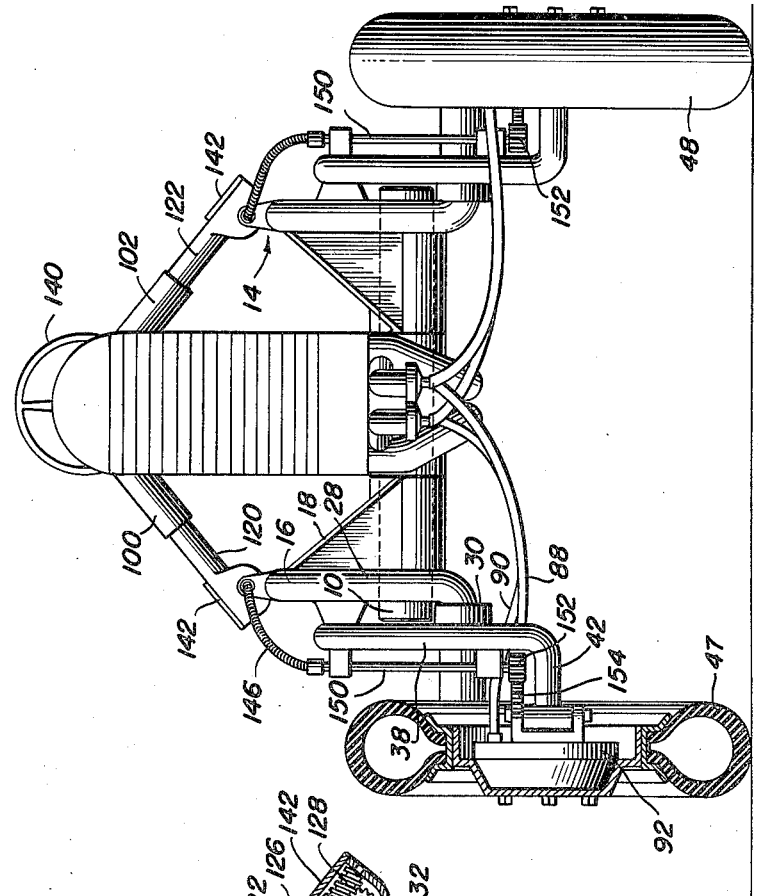
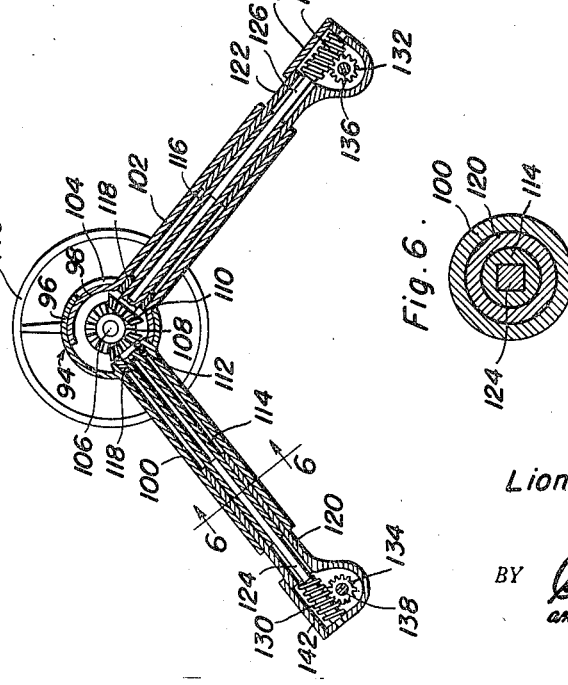
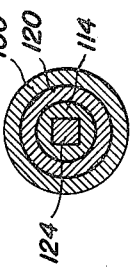
Lionel R. Bergen
INVENTOR.

Patented Mar. 6, 1951

2,544,521

UNITED STATES PATENT OFFICE 2,544,521

WHEEL MOUNTING ARRANGEMENT FOR VEHICLES

Lionel R. Bergen, Iola, Wis.

Application May 11, 1948, Serial No. 26,412

4 Claims. (Cl. 280—81.5)

This invention appertains to novel and useful improvements in tractors.

An object of this invention is to extensibly support frame members on a bar or main body pin, said frame members having wheels associated therewith, thereby forming a laterally extensible chassis for a tractor.

Another object of this invention is to provide a six wheel tractor having four of the wheels rockingly supported, whereby ground contact may be effectively maintained.

Another object of this invention is to simultaneously turn two or four of the wheels of the six wheel tractor.

Another purpose of this invention is to support the frame members by extensible means.

Another object of this invention is to provide improved means for steering the tractor.

A still further object of this invention is to provide a generally improved tractor capable of improved function and performance in connection with agricultural work.

Ancillary objects and features of novelty will become apparent to those skilled in the art, and following the description of the preferred form of the invention, illustrated in the accompanying drawings, wherein:

Figure 4 is a sectional view taken substantially on line 4—4 of Figure 2 and in the direction of the arrows;

Figure 5 is a sectional view of the steering mechanism forming a part of the present invention;

Figure 6 is a sectional view taken on the line 6—6 of Figure 5 and in the direction of the arrows;

Figure 7 is a fragmentary sectional view showing particularly the means of adjustably supporting one of the frame members.

This invention has been developed to provide a device for performing relatively difficult farm operations including sharp turning and including operations which must be performed on irregular terrain.

Figure 2:
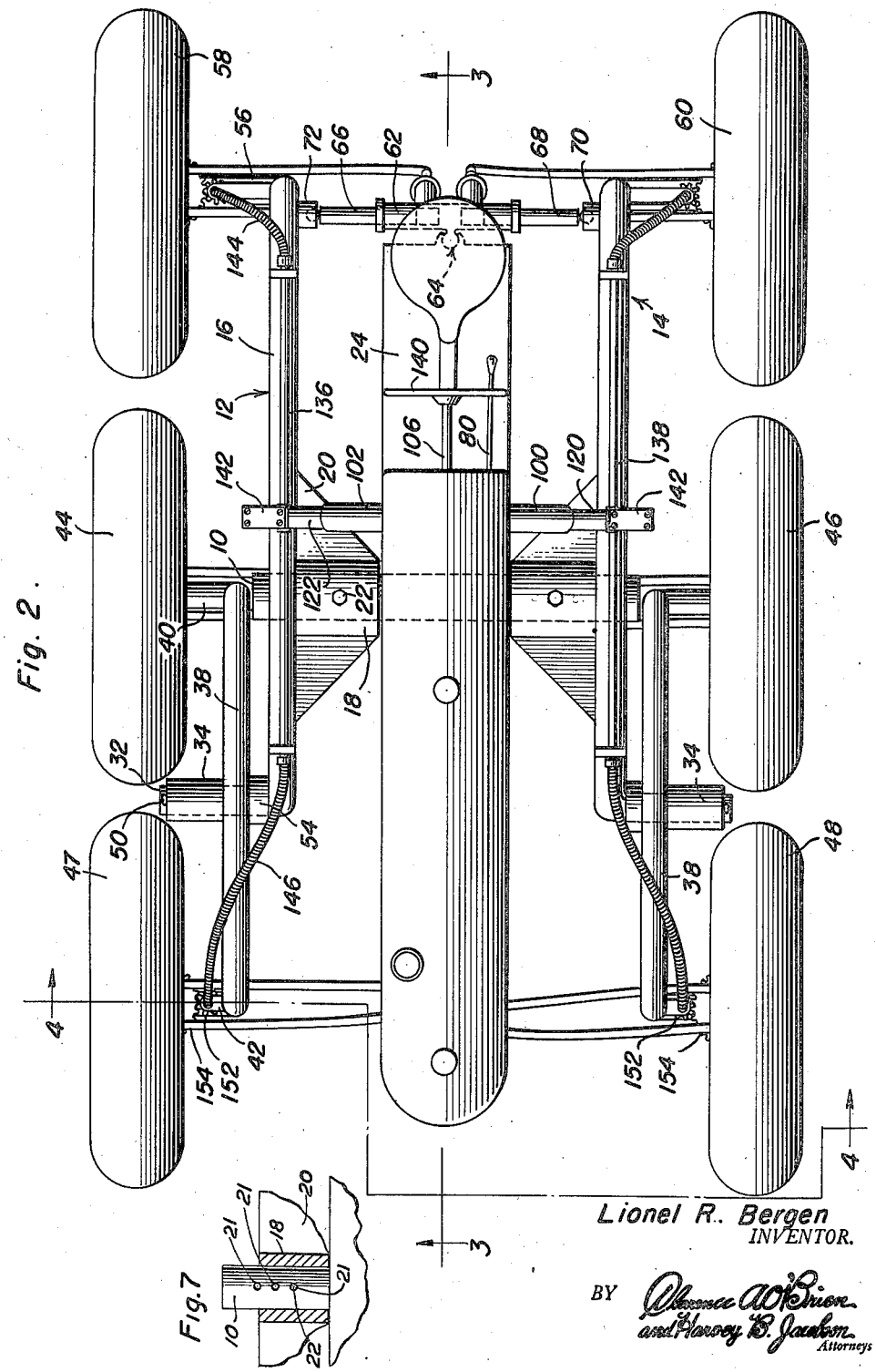
Figure 2 is a plan view of the invention.

In viewing Figure 2 is will be seen that the bar 10 is supplied with a pair of frame members generally indicated at 12 and 14 respectively. In Figure 2 it will be noted that the preferred form of the invention is symmetrical about its longitudinal axis and therefore, a description of one side of the tractor will necessarily lead to a clear understanding of the duplicate structure on the opposite side thereof. Noting the frame member 12 it will be seen that it is composed of a rail 16 having a boss 18 rigidly secured thereto. Gusset plates 20 may be supplied wherever it is found desirable to lend rigidity and strength to the construction. Further, the said bar 10 is supplied with a plurality of apertures 21 therein in order to accommodate a pin 22. The said pin extends through the bearing 18 and is supplied in one of the selected number of apertures 21. By this means the entire frame member is laterally adjustable relative to the longitudinal axis of the said tractor.

Figure 1:
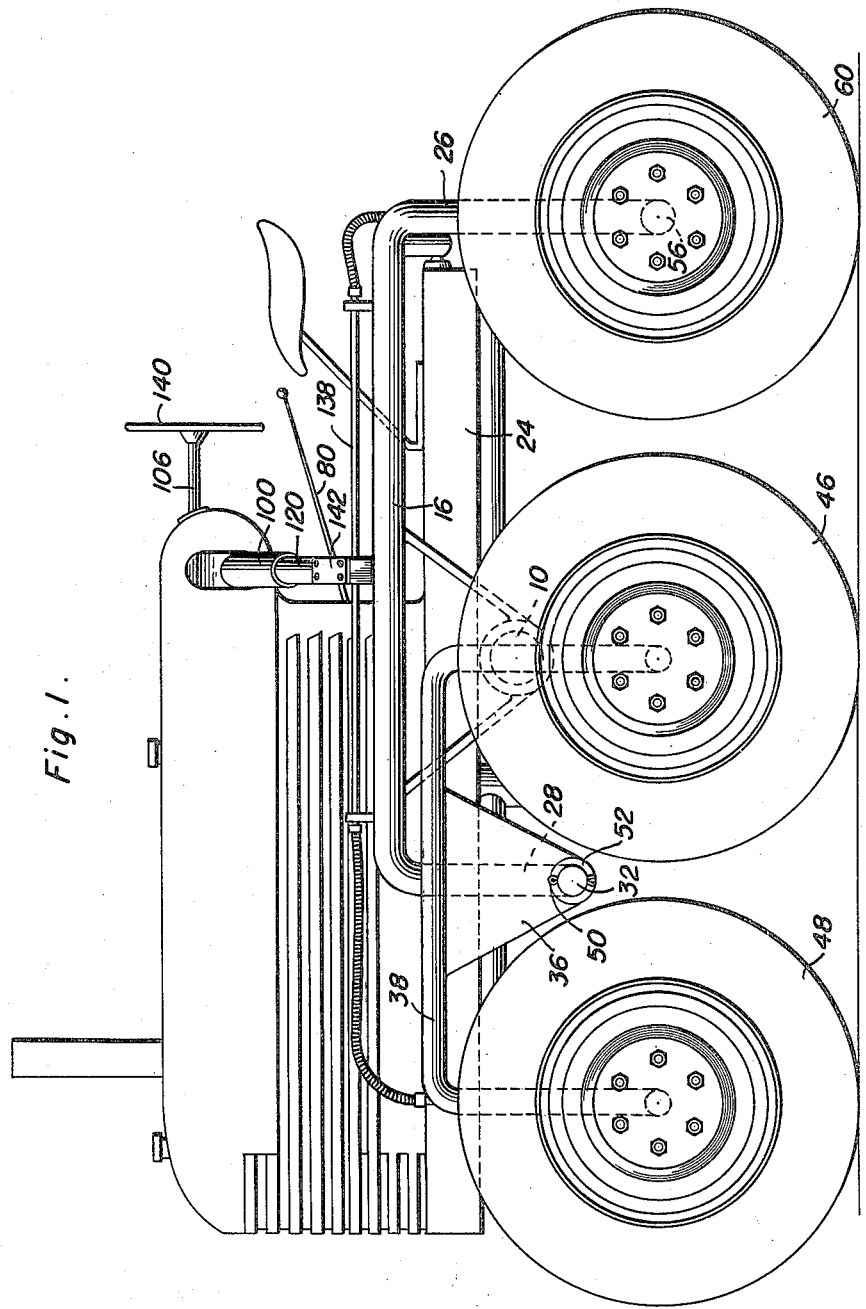
Figure 1 is an elevational side view of the preferred form of the invention.

Viewing Figure 1 it will be seen that the bar 10 projects beneath a platform 24 and the frame member 12 has right angular end portions 26 and 28 respectively. The said right angular end portion 28 has a substantially right angular extension 32 integral therewith, which accommodates a bearing 34. The said bearing 34 is integrally associated with a bracket 36, which is in turn secured to a substantially U-shaped rocker arm 38.

The said rocker arm 38 has right angular terminals 40 and 42 respectively, whereon wheels 44 and 46 are journaled. An identical structure is supplied on the opposite side of the longitudinal axis of the tractor and has wheels 47 and 48 associated therewith.

Considering one pair of wheels 46 and 44 it will be noted that they may be rocked about the right angular extension 32 as a pivot center, with the rocking of the rocker arm 38. By this expedient ground contact is efficaciously maintained.

Any suitable means may be used for maintaining the bearing 34 on the pivot extension 32 such as the cotter pin 50 and washer 52 construction. Further, spacing collars 54 may be associated with the rear portion of the said rocker arm 38, if it is found desirable.

The substantially U-shaped member or rail 16 is supplied with a right angular extending portion 56 whereon a wheel 58 is journaled. The said wheel 58 has an opposed complemental wheel 60 on the opposite side of the tractor and the wheels 58 and 60 are referred to as a pair of wheels. This pair of wheels is supplied at the rear ends of the frame members 12 and 14.

Extensible means for supporting the rear portions of the said frames 12 and 14 is supplied. The extensible means may be seen best in Figure 2 wherein there is disclosed a sleeve 62 having a ball end socket connection generally indicated at 64 associated therewith and the said platform 24. Rods 66 and 68 respectively having ball connections at the ends thereof are slidably received in the bore of the said sleeve 62. Bosses 70 and 72 respectively are secured to said frame members 12 and 14 for accommodation of the said balls. Of course, this construction renders the rods 66 and 68 swivelly connected with the frame members 12 and 14 and also, the said sleeve 62 being swivelly connected with the platform 24. In adjusting the tractor for various widths, the rear portions of the frame members 12 and 14 are of course supported by this construction.

Figure 3:
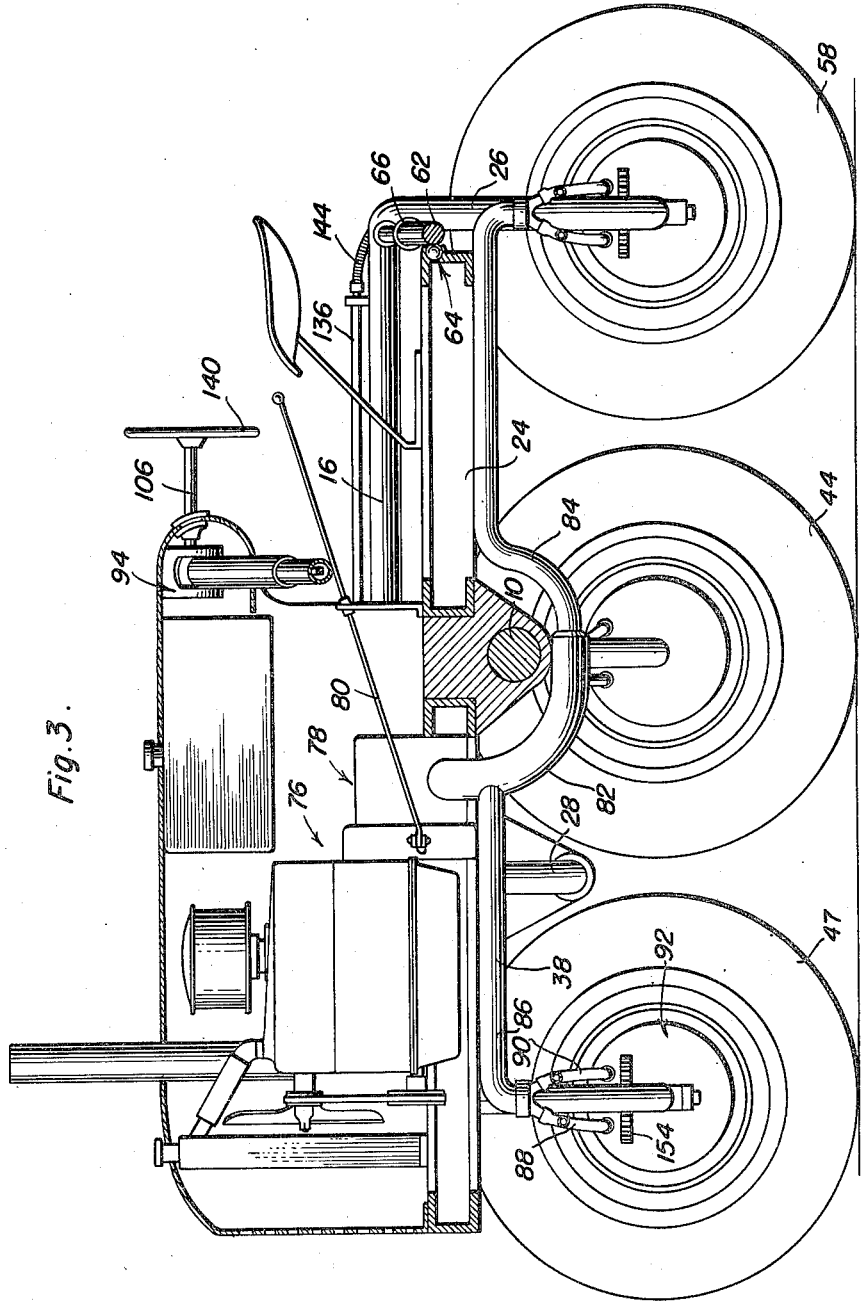
Figure 3 is a sectional view taken on the line 3—3 of Figure 2 and in the direction of the arrows.

Referring now to Figure 3 the means for rendering the tractor is illustrated. A conventional combustion engine generally indicated at 76 and a conventional fluid pump 78 is driven thereby. The usual, conventional control rod 80 extends from a pertinent portion of the driving gear of the tractor and, a manifold 82 extends from the said fluid pump 78. The said manifold 82 includes a plurality of conduits 84 and 86 having pairs of flexible tubes 88 and 90 respectively extending therefrom at various points. Each pair of flexible tubes 88 and 90 terminates in a conventional wheel driving turbine or similar unit 92 which is associated with each wheel. It is readily apparent that the manifold may have two, four or six pairs of flexible tubes 88 and 90 respectively extending therefrom for each side of of the tractor. Also, if it is found desirable only one, two or any number of driving wheels may be utilized.

Means for steering the said wheels is provided. The preferable means may be seen as including a gear case 94 composed of a first substantially cylindrical sleeve 96 having a second substantially cylindrical sleeve 98 rotatably positioned therein.

The said sleeve 96 has a hollow shaft 100 rigidly secured thereto, while the said sleeve 98 has an identical hollow shaft 102 associated therewith. The outer or larger sleeve 96 is supplied with an opening 104 which is utilized for accommodating the said sleeve 102. By this construction the hollow shafts 100 and 102 may be moved relative to each other to partially compensate for adjusting the lateral width of the frame members 12 and 14.

A shaft 106 is journaled in the said gear box 94 and has a ring gear 108 secured thereto. The said ring gear is emmeshed with a pair of bevel gears 110 and 112 respectively which are in turn secured to square bore shafts 114 and 116. The said square bore shafts are positioned within the said hollow shafts 100 and 102 respectively and are spaced therefrom by means of collars or bushings 118.

Tubes 120 and 122 respectively are slidably received in the said hollow shafts 100 and 102 respectively, being interposed between the square bore shafts and the said hollow shafts. A pair of identical square shafts 124 and 126 respectively are received within the square bore of the said square bore shafts and the said square shafts have worms 128 and 130 respectively attached thereto. As is seen in Figure 5 the said worms are emmeshed with gears 132 and 134, which last mentioned gears are rigidly secured to counter-shafts 136 and 138. Now, it may be seen that upon rotation of the wheel 140 which is attached to said shaft 106, the rotation will be transmitted to the shafts 136 and 138. Further, upon adjustment of the frame members 12 and 14 respectively, the steering gear mechanism will be appropriately compensated to render the steering properly operative for the various and sundry adjustments.

Detachable cover plates 142 are supplied at enlarged portions of the said tubes 120 and 122, as is seen in Figure 2 to render access to the said worm and gear construction. In Figure 2 it will also be noted that the said shafts 136 and 138 are journaled on the frame members. Also, sheathed cables 144 and 146 respectively extend from the terminal portions of each shaft 138 and 136. The sheathed cables are appropriately fastened by conventional means and have rigid shafts 150 driven thereby. At the terminal portions of the said rigid shafts 150, a pinion 152 is supplied. This pinion is emmeshed with a quadrant gear 154, which is in turn secured to an appurtenant wheel, preferably at the king pin and bearing suspension point.

In Figure 2 it will be noted that four wheels are steered or turned by the above described structure. However, it is readily apparent that only two wheels may be rendered operative if it is found desirable, or on the other hand, the six illustrated wheels might be deemed desirable as turning wheels.

It is readily appreciated that the invention may be utilized with substantially any practical number of wheels such as four, six, eight.

From the foregoing the operation of the present invention is deemed apparent. It is understood of course that various changes, additions and rearrangement of elements may be made without departing from the spirit thereof. Accordingly, limitation is sought only in accordance with the scope of the following claims.

Having described the invention, what is claimed as new is:

1. A vehicle construction comprising a chassis which includes a platform, a transverse bar forming a part of said platform, a pair of frame members each secured intermediate its ends to one end of said transverse bar, means to rigidly fix said frame members in selected positions of lateral adjustment on said bar, each frame member having a front and a rear extension projecting laterally with respect to said chassis, wheels disposed on the rear extensions, rockers, each rocker pivoted intermediate the ends thereof to one of the front extensions, a plurality of wheels, means disposed at the ends of each of said rockers supporting said wheels, and extensible means swivelly secured to said platform at the rear end thereof and to said frame members at the rear ends partially supporting said frame members.

2. A vehicle construction comprising a chassis which includes a platform with a transverse bar carried thereby, a pair of frame members, each frame member secured intermediate its ends to one end of said transverse bar, and means connected with said bar and said frame members to rigidly hold said frame members in selected positions of adjustment laterally of the platform, each frame member having a front and a rear extension projecting laterally with respect to said chassis, wheels disposed on the rear extensions, rockers, each rocker pivoted intermediate the ends thereof to one of the front extensions, a plurality of wheels and means disposed at the ends of each of said rockers supporting said wheels, and extensible means swivelly secured to said platform at the rear end thereof and swivelly secured to each of said frame members at the rear ends thereof partially supporting said frame members.

3. A vehicle construction comprising a chassis which includes a platform with a transverse bar carried thereby, a pair of frame members, each frame member secured intermediate its ends to one end of said transverse bar, and means connected with said bar and said frame members to rigidly hold said frame members in selected positions of adjustment laterally of said platform, each frame member having a front and a rear extension projecting laterally with respect to said chassis, wheels disposed on the rear extensions, rockers, each rocker pivoted intermediate the ends thereof to one of the front extensions, a plurality of wheels and means disposed at the ends of each of said rockers supporting said wheels, a steering mechanism including extensible members carried by said platform at the rear end thereof and said frame members, and means operatively connecting said steering mechanism and at least one wheel disposed on each side of said tractor.

4. A vehicle construction comprising a chassis which includes a platform with a transverse bar carried thereby, a pair of frame members, each frame member secured intermediate its ends to one end of said transverse bar, means connected with said bar and said frame members to rigidly hold said frame members in selected positions of adjustment laterally of said platform, each frame member having a front and a rear extension projecting laterally with respect to said chassis, wheels disposed on the rear extensions, rockers, each rocker pivoted intermediate the ends thereof to one of the front extensions, a plurality of wheels and means disposed at the ends of each of said rockers supporting said wheels, a steering mechanism including extensible members carried by said platform at the rear end thereof and said frame members, means operatively connecting said steering mechanism and at least one wheel disposed on each side of said tractor, and extensible means swivelly secured to said platform at the rear end thereof and to said frame members at the rear ends thereof partially supporting said frame members.

LIONEL R. BERGEN.

REFERENCES CITED

The following references are of record in the file of this patent:

UNITED STATES PATENTS

| Number | Name | Date |
|---|---|---|
| 1,191,809 | Michelin | July 18, 1916 |
| 1,397,747 | Towner | Nov. 22, 1921 |
| 1,967,283 | Brown | July 24, 1934 |
| 1,973,681 | Clarkson | Sept. 11, 1934 |
| 2,074,685 | Engstrom | Mar. 23, 1937 |
| 2,132,828 | Montambo | Oct. 11, 1938 |
| 2,168,905 | Lear | Aug. 8, 1939 |
| 2,260,574 | Martin | Oct. 28, 1941 |
| 2,355,604 | Rupp | Aug. 15, 1944 |
| 2,393,324 | Joy | Jan. 22, 1946 |